(12) United States Patent
Rothman

(10) Patent No.: US 8,447,645 B2
(45) Date of Patent: May 21, 2013

(54) SYSTEM AND METHOD FOR DYNAMIC PRODUCT PRICING

(75) Inventor: Simon Rothman, Palo Alto, CA (US)

(73) Assignee: Glyde Corporation, Palo Alto, CA (US)

( * ) Notice: Subject to any disclaimer, the term of this patent is extended or adjusted under 35 U.S.C. 154(b) by 0 days.

(21) Appl. No.: 11/963,382

(22) Filed: Dec. 21, 2007

(65) Prior Publication Data

US 2009/0164383 A1    Jun. 25, 2009

(51) Int. Cl.
| | |
|---|---|
| G06Q 10/00 | (2012.01) |
| G06Q 30/00 | (2012.01) |
| G06F 17/00 | (2006.01) |
| G06G 7/00 | (2006.01) |

(52) U.S. Cl.
USPC .......................... 705/7.35; 705/400

(58) Field of Classification Search
USPC ................................ 705/400, 7.35
See application file for complete search history.

(56) References Cited

U.S. PATENT DOCUMENTS

| | | | |
|---|---|---|---|
| 5,117,364 A | 5/1992 | Barns-Slavin et al. | |
| 5,664,115 A | 9/1997 | Fraser | |
| 6,131,087 A | 10/2000 | Luke et al. | |
| 6,490,567 B1 | 12/2002 | Gregory | |
| 6,564,213 B1 | 5/2003 | Ortega et al. | |
| 6,598,027 B1 | 7/2003 | Breen et al. | |
| 6,714,922 B1 | 3/2004 | Sansone et al. | |
| 6,772,130 B1 | 8/2004 | Karbowski et al. | |
| 6,839,690 B1 | 1/2005 | Forth et al. | |
| 7,111,252 B1 | 9/2006 | Harris | |
| 7,155,663 B2 | 12/2006 | Landsman et al. | |
| 7,197,475 B1 | 3/2007 | Lorenzen et al. | |
| 7,254,774 B2 | 8/2007 | Cucerran et al. | |
| 7,266,513 B2 | 9/2007 | Chalmers et al. | |
| 7,373,313 B1 | 5/2008 | Kahle et al. | |
| 7,418,410 B2 | 8/2008 | Caiafa | |
| 7,447,678 B2 | 11/2008 | Taylor et al. | |
| 7,497,369 B2 | 3/2009 | Dalzell et al. | |
| 7,580,863 B2 | 8/2009 | Broussard et al. | |
| 7,610,233 B1 | 10/2009 | Leong et al. | |
| 7,630,919 B1 | 12/2009 | Obrecht | |
| 7,711,604 B1 | 5/2010 | Walker et al. | |
| 7,774,234 B1 | 8/2010 | Kopelman et al. | |
| 7,778,878 B2 | 8/2010 | Harding et al. | |

(Continued)

OTHER PUBLICATIONS

Smith, Michael D. "The Impact of Shopbots on Electronic Markets" Academy of Marketing Science. Fall 2002. p. 446.*

(Continued)

*Primary Examiner* — John Hayes
*Assistant Examiner* — Allen J Jung
(74) *Attorney, Agent, or Firm* — Kilpatrick Townsend & Stockton LLP

(57) ABSTRACT

Embodiments of the present invention provide a system and method for dynamic product pricing. According to one embodiment, sale characteristics for a plurality of products are stored in a database. A user places a sale order including information associated with a product to be listed on a website, and a market price for the product is calculated based on the stored sale characteristics of the product. The sales characteristics include a queue of current list prices of the product as well as recent sale prices, with the queue having the number of the product available for sale at each different price. A suggested list price is displayed to the seller based on the market price. The seller is provided with a means for adjusting the suggested list price or listing the product at the suggested list price.

20 Claims, 3 Drawing Sheets

U.S. PATENT DOCUMENTS

| | | | |
|---|---|---|---|
| 7,792,704 B2 | 9/2010 | Harding et al. | |
| 7,877,330 B2 | 1/2011 | Siegel et al. | |
| 2001/0032116 A1* | 10/2001 | Hyatt | 705/10 |
| 2001/0034631 A1* | 10/2001 | Kiselik | 705/8 |
| 2001/0037261 A1 | 11/2001 | Ishitsuka | |
| 2001/0054008 A1 | 12/2001 | Miller et al. | |
| 2002/0002527 A1 | 1/2002 | Holtzman | |
| 2002/0032668 A1 | 3/2002 | Kohler et al. | |
| 2002/0107820 A1 | 8/2002 | Huxter | |
| 2002/0107861 A1 | 8/2002 | Clendinning et al. | |
| 2002/0113815 A1 | 8/2002 | DeGross | |
| 2003/0020758 A1 | 1/2003 | Hinderks | |
| 2003/0023499 A1 | 1/2003 | Das et al. | |
| 2003/0023500 A1* | 1/2003 | Boies et al. | 705/26 |
| 2003/0061147 A1 | 3/2003 | Fluhr et al. | |
| 2003/0065573 A1 | 4/2003 | Nagel et al. | |
| 2003/0105682 A1 | 6/2003 | Dicker et al. | |
| 2003/0182222 A1 | 9/2003 | Rotman et al. | |
| 2003/0200156 A1 | 10/2003 | Roseman et al. | |
| 2003/0204447 A1 | 10/2003 | Dalzell et al. | |
| 2003/0229552 A1* | 12/2003 | Lebaric et al. | 705/35 |
| 2004/0088328 A1 | 5/2004 | Cook et al. | |
| 2004/0193436 A1 | 9/2004 | Stashluk et al. | |
| 2005/0004889 A1 | 1/2005 | Bailey et al. | |
| 2005/0071249 A1 | 3/2005 | Nix et al. | |
| 2005/0102202 A1 | 5/2005 | Linden et al. | |
| 2005/0144052 A1 | 6/2005 | Harding et al. | |
| 2005/0192893 A1 | 9/2005 | Keeling et al. | |
| 2005/0267774 A1* | 12/2005 | Merritt et al. | 705/1 |
| 2006/0069616 A1 | 3/2006 | Bau | |
| 2006/0085272 A1 | 4/2006 | Case et al. | |
| 2006/0190379 A1* | 8/2006 | Maas et al. | 705/35 |
| 2006/0212355 A1 | 9/2006 | Teague et al. | |
| 2006/0265259 A1 | 11/2006 | Diana et al. | |
| 2007/0028185 A1 | 2/2007 | Bhogal et al. | |
| 2007/0083440 A1 | 4/2007 | Wirtz et al. | |
| 2007/0208635 A1 | 9/2007 | Van Luchene et al. | |
| 2007/0255644 A1 | 11/2007 | Elder | |
| 2008/0040323 A1 | 2/2008 | Joshi | |
| 2008/0109327 A1 | 5/2008 | Mayle et al. | |
| 2008/0114807 A1 | 5/2008 | Sembower | |
| 2008/0235042 A1 | 9/2008 | Boyd et al. | |
| 2008/0288368 A1 | 11/2008 | Marks et al. | |
| 2009/0064056 A1 | 3/2009 | Anderson et al. | |
| 2009/0132270 A1 | 5/2009 | Baptiste | |
| 2009/0164315 A1 | 6/2009 | Rothman | |
| 2009/0248494 A1 | 10/2009 | Hueter et al. | |
| 2009/0276522 A1 | 11/2009 | Seidel | |
| 2010/0023311 A1 | 1/2010 | Subrahmanian et al. | |
| 2011/0078232 A1 | 3/2011 | Van Den Driessche | |
| 2011/0184834 A1 | 7/2011 | Perrochon et al. | |

OTHER PUBLICATIONS

Office Action for U.S. Appl. No. 11/963,675, mailed Sep. 24, 2010.
Office Action for U.S. Appl. No. 11/963,675, mailed on Jun. 9, 2011.
Office Action for U.S. Appl. No. 11/963,711, mailed on Jan. 25, 2011.
Office Action for U.S. Appl. No. 11/963,718, mailed on Apr. 6, 2011.
Office Action for U.S. Appl. No. 11/963,470, mailed on Aug. 18, 2010.
Office Action for U.S. Appl. No. 11/963,470, mailed on May 12, 2011.
Office Action for U.S. Appl. No. 11/963,592, mailed on Feb. 2, 2010.
Notice of Allowance for U.S. Appl. No. 11/963,592, mailed on Sep. 16, 2010.
Office Action for U.S. Appl. No. 11/963,601, mailed on Sep. 14, 2010.
Notice of Allowance for U.S. Appl. No. 11/963,601, mailed on Dec. 17, 2010.
"GoShip.com Launches Service That Empowers Online Buyers to Choose Parcel Shipping Method and Allows Merchants to Cut Losses"; PR Newswire; (Apr. 3, 2000).
Office Action for U.S. Appl. No. 13/555,294, mailed on Nov. 9, 2012.
Office Action for U.S. Appl. No. 12/906,013, mailed on Jul. 12, 2012.
Office Action for U.S. Appl. No. 11/963,470, mailed on Aug. 1, 2012.
Office Action for U.S. Appl. No. 13/164,385, mailed on Nov. 29, 2012.
Amazon.com: Modern Times: Music: Bob Dylan, http://web.archive.org/web/20071107075225rn_1/www.amazon.com/ (Retrieved from the Internet on Mar. 25, 2011).
Office Action for U.S. Appl. No. 11/963,711, mailed on Oct. 27, 2011.
Office Action for U.S. Appl. No. 11/963,718, mailed on Oct. 19, 2011.
Office Action for U.S. Appl. No. 11/963,675, mailed on Jun. 15, 2012.

* cited by examiner

SYSTEM AND METHOD FOR DYNAMIC PRODUCT PRICING

CROSS-REFERENCES TO RELATED APPLICATIONS

Related applications are Ser. No. 11/963,675, "Virtual Shelf with Single Product Choice and Automatic Multiple Vendor Selection"; Ser. No. 11/963,711, entitled "Software System for Decentralizing eCommerce with Single Page Buy"; Ser. No. 11/963,718, entitled "3D Product Display on Internet with Content or Transaction Data on Back of Image"; Ser. No. 11/963,740, entitled "Product Distribution System and Method Thereof"; Ser. No. 11/963,592, "System and Method for Providing Real-Time Search Results on Merchandise"; Ser. No. 11/963,601, "System and Method for Integrated Payment and Shipping Information"; all filed even date herewith.

BACKGROUND OF THE INVENTION

The present invention generally relates to the pricing of a product to be sold over a network, and in particular to determination of a market price for a product to be sold on a website.

The immense popularity of the internet has given millions of individual users the ability to buy and sell practically any given item. Amazon.com, eBay, and Craig's list are just a few of the many websites that provide the means for the purchase and sale of thousands of new and used goods. As a result, buyers are now able to comparison-shop various websites and sellers offering the same product in order to find the most favorable price and terms of sale.

Unfortunately, this type of background research consumes copious amounts of time for the buyer, and in the end, confusion may still exist as to whether a product has been properly priced. Shipping and handling costs are often embedded in the sales price, often to the surprise of the buyer. Sellers are also inconvenienced as inefficient price management makes it hard for the seller to know how to effectively price their goods. As the number of online buyers and sellers constantly increases in today's ever changing marketplace, the variety in pricing also increases, and a true market price remains obscure to both the buyer and seller alike.

Many pricing systems have been developed in an effort to address the aforementioned problems. For example, Demand Tec Inc., U.S. Pat. No. 6,851,604, discloses a system for updating prices for a particular subset of items. Alibris.com, U.S. Patent Publication No. 2005/0071249, discloses a method and system for repricing a good for sale in an online transaction. In particular, when a seller wishes to change a listed price due to varying market conditions, the seller sends the system a repricing request and selects a new price. Though these systems account for price changes relative to the market, the seller is still inconvenienced by having to reprice the item after its initial listing. Since the market constantly changes, the seller still remains unsure as to whether a product has been listed at an optimum price, thereby causing the market to remain unstable and the true market price for a particular product to remain unknown.

Accordingly, there is a need in the art for a more efficient system and method for pricing a product to be sold in an online transaction.

BRIEF SUMMARY OF THE INVENTION

Embodiments of the present invention provide a system and method for dynamic product pricing. According to one embodiment, sale characteristics for a plurality of products are stored in a database. A user places a sale order including information associated with a product to be listed on a website, and a market price for the product is calculated based on the stored sales characteristics of the product. The sales characteristics include a queue of current list prices for the product, with the queue having the number of products available for sale at each different price. A suggested list price is displayed to the seller based on the calculated market price. The seller is provided with a means for adjusting the suggested list price or listing the product at the suggested list price. Accordingly, a specific product is given a true market price, or one true value at any one moment of time. The true market price thus varies with supply and demand. The specific product corresponds to a stock keeping unit (SKU), with a market price for SKU, which may be a particular version, color, condition, etc.

According to another embodiment, the seller is shown sale statistics concerning the likelihood of the product being sold at the suggested price or the adjusted price. The seller can either select the adjusted price or simply select the suggested list price as the list price. Next, the list price of the product is placed in a sale queue associated with the product.

In one embodiment, when the seller agrees to list at the suggested list price, the seller can choose a dynamic or static market order. In this way, the list price will change with the market until the product is sold (dynamic) or remain at the initial list price (static). In one embodiment, the market pricing is applied to a multi-vendor website where only a single vendor item is displayed to a potential buyer. Thus, the lowest priced, best vendor item will be displayed, and higher priced ones will wait in the sale queue until all the lower priced ones have sold. Thus, buyers see only one list price.

It is to be appreciated that embodiments of the present invention provide many advantages over conventional techniques. For example, according to one embodiment of the present invention, the market price is automatically determined and a suggested list price associated with the market price is displayed to the seller prior to listing the product. Accordingly, with just one click the seller can quickly list the product based on the current market price. Moreover, since sale statistics of the suggested list price and the adjusted price are shown to the seller, the seller can evaluate and determine an optimum price for sale. This technique enables a seller to quickly and effectively price a product relative to the supply and demand for the product, ultimately allowing the market price for the product to reach equilibrium, and giving the buyer and seller the confidence that a product was priced based on the current market for the product.

DETAILED DESCRIPTION OF THE INVENTION

Embodiments of the present invention provide a system and method for dynamic product pricing. The following description is provided to enable any person skilled in the art to make and use the invention and sets forth the best modes contemplated by the inventor for carrying out the invention. Various modifications will remain readily apparent to those skilled in the art. Any and all such modifications, equivalents and alternatives are intended to fall within the spirit and scope of the present invention.

System

Figure 1:
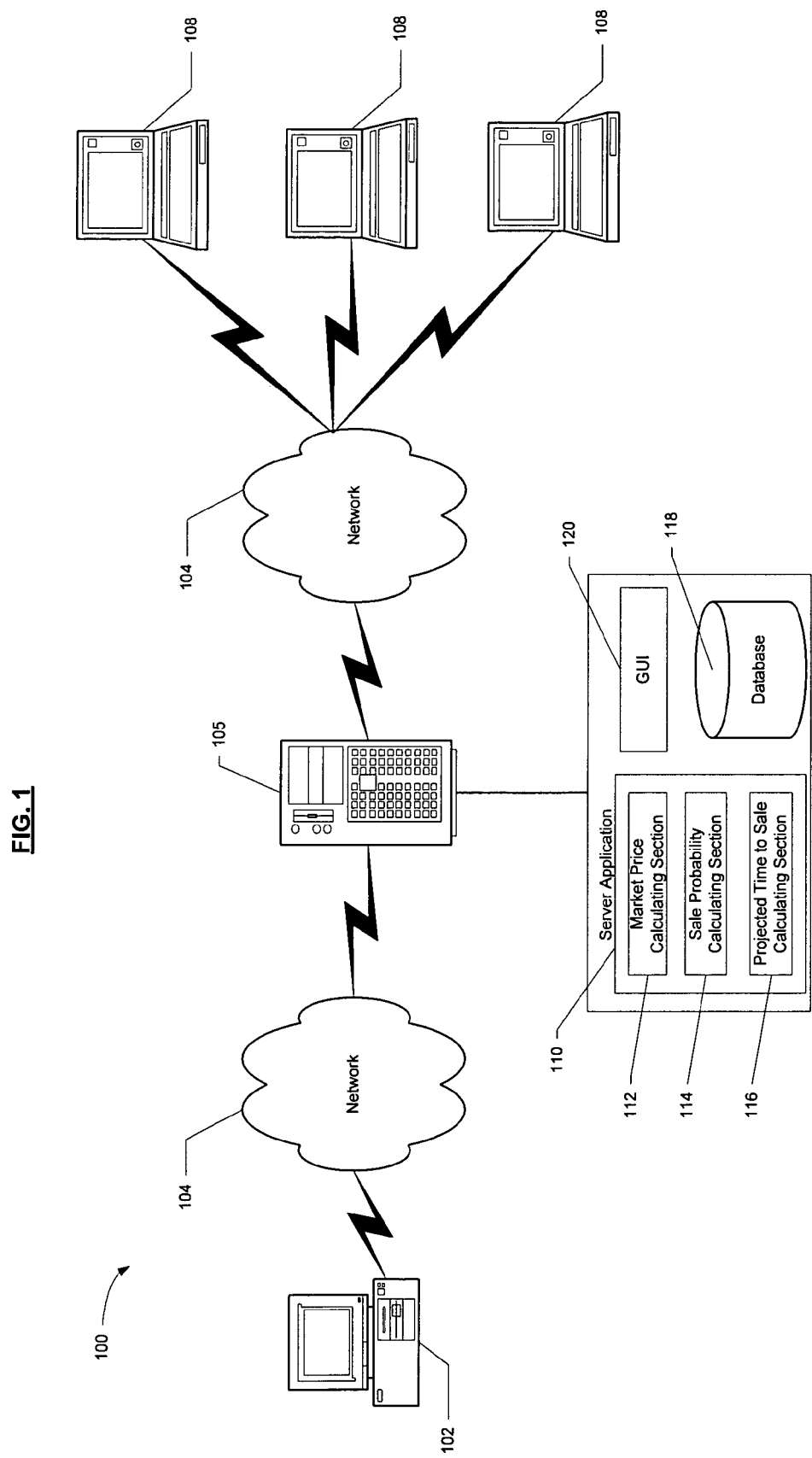
FIG. 1 is a simplified diagram illustrating the overall product pricing system according to an embodiment of the present invention.

FIG. 1 is a simplified diagram illustrating of an overall product pricing system according to an embodiment of the present invention. As shown, the system 100 includes terminals 102 and 108, network 104 (i.e. the internet), server 105, server application 110, graphical user interface (GUI) 120, and database 118. The terminals 102 and 108 are connected to server 105 via network 104. Terminal 102 is a buyer terminal, and terminals 108 are seller terminals.

The server 105 includes server application 110, GUI 120, and database 118. In a specific embodiment, the server 105 hosts a multi-vendor website that offers certain products for sale. The server may be implemented using multiple computing devices. The server application 110 includes a market price calculating section 112, sale probability calculating section 114, and projected time to sale calculating section 116. These components will be described in more detail below with reference to FIG. 2.

The database 118, among other things, is configured to store sale characteristics for a particular product. As an example, the database 118 is integrated in the server 105 and may also include multiple storage devices linked to one another. According to one embodiment, the sale characteristics of a product include a history of list and sold prices, the product condition, the product identification number (SKU, UPC, ISBN, etc.), current rate of sale, and sale queue information. For example, for a particular product (DVD, CD, book, camera, etc.), the database 118 stores the price at which it was originally listed, the final sale price of the product, the condition of the product (new, excellent, good), the number identifying the specifications of the product, the length of time from list to sale, and a queue of current list prices of the product. The database 118 may also store other information such as the number of products which have sold at a given price, and a minimum and maximum suggested list price. In addition, the database may store bid characteristics for a particular item including a list of offer prices and the current rate of bidding.

The user terminals 102 and 108 are shown connected to network 104 for browsing the multi-vendor website provided by the server 105 (for buyers, to search for products to buy; for sellers, to post products for sale). The terminals 102 and 108 may be any type of computing device that provides network connectivity and allows a user to browse a website. For instance, terminals 102 and 108 may be a personal computer, a cellular phone, or a personal digital assistant. In one embodiment, seller terminals 108 represent a plurality of sellers that offer products to be sold on the multi-vendor website. User terminal 102 represents a buyer searching for a desired product offered on the multi-vendor website.

Single Product Display on Multi-vendor Site

In one embodiment, the market pricing of the present invention is applied to a multi-vendor website where only the lowest priced vendor item is displayed to a potential buyer. The lowest price item is typically the lowest priced item offered by any vendor, but can also be the lowest priced item offered by the best vendor (i.e. the vendor with a highest reliability rating). Thus, the lowest price, best vendor item will be displayed, and higher priced ones will not be displayed until all the lower priced ones have sold. Thus, an efficient market can be established. This model may vary based on region due to the shipping costs. For instance, if a vendor is in a region where the demand can only be met by distant sellers with higher shipping costs, the buyer's total purchase price may be higher, since when combined with shipping costs the purchase price may be the same as the lowest priced item but at the higher distant seller cost. In an alternate embodiment, multiple products are displayed to potential buyers at multiple websites or on one website, and the user is able to compare and is assumed to pick the lowest price product available. Thus, again the market price can be determined by the lowest priced products, taking into account the inventory at that price and the demand. Details of such a multi-vendor/single product view system are set forth in co-owned application Ser. No. 11/963,675, filed even date herewith, the disclosure of which is hereby incorporated herein by reference.

Calculation and Display of Market Price to Potential Seller

Figure 2:
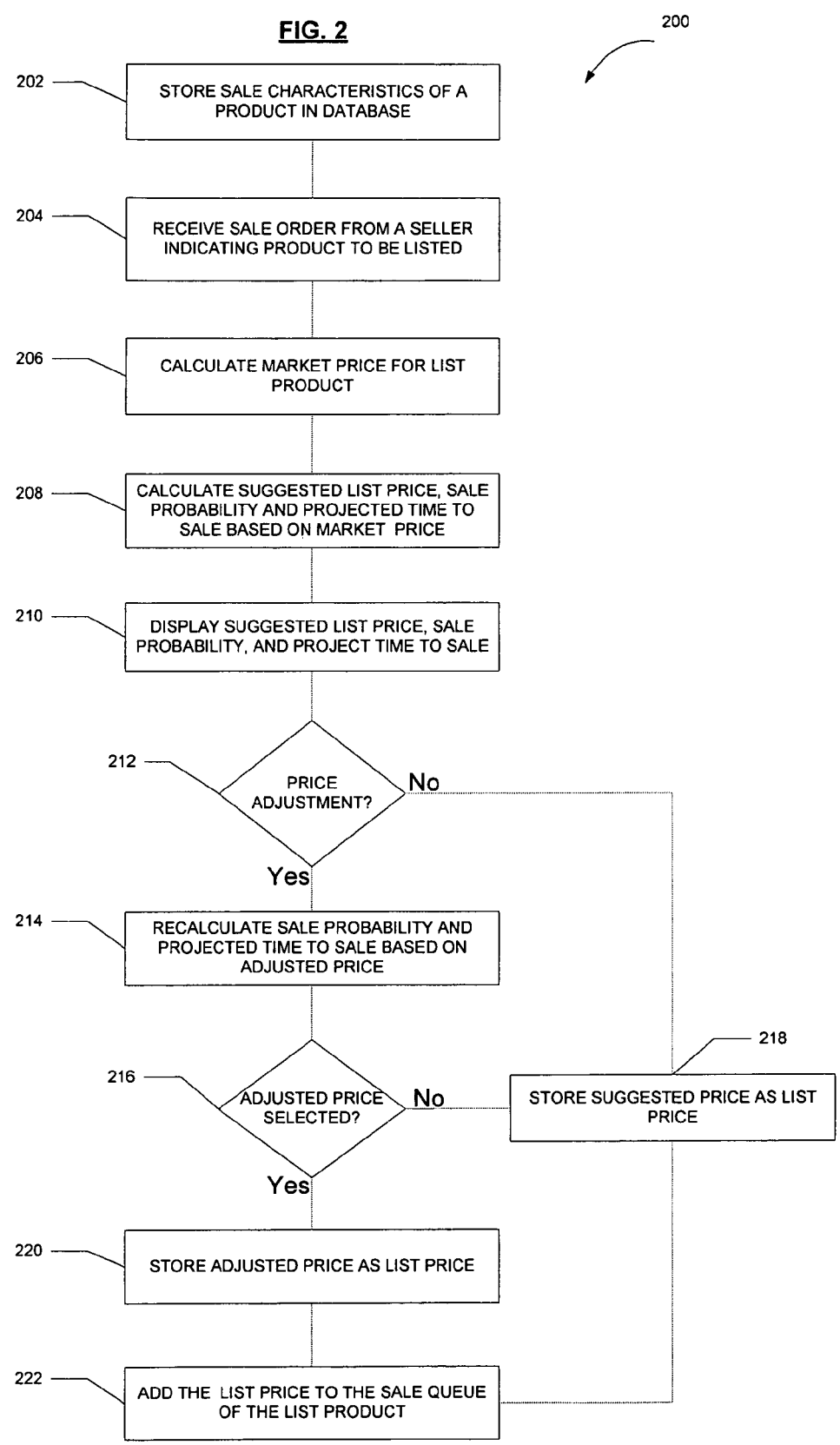
FIG. 2 is a simplified flow diagram illustrating the process of the dynamic product pricing system according to an embodiment of the present invention.

FIG. 2 is a simplified flowchart of the product pricing system according to an embodiment of the present invention. In step 202, sale characteristics of a particular product are stored in a database. When a product is listed for sale on the multi-vendor website, the sale characteristics of the product include the suggested list price of the item, the history of sold prices, and the current sale queue information. Moreover, a minimum and maximum price list price can be set based on external market information, internal market dynamics, and the condition of the product.

Further, the maximum list price of a particular product may be determined by calculating the price distribution of the same condition product from the stored sale characteristics or from external sources offering the product for sale. As for an item of highest condition (i.e. new or excellent), the maximum list price may be determined based on the current market price on the multi-vendor website and the price of the product on external sources. In one embodiment, a reasonable price range for the product is determined based on these prices, and a maximum range is set so that the product may not be priced above this range. Alternately, the maximum list price can be set by examining the demand for the product and the availability of that product at various prices, and determining a likelihood of selling above a certain price. The maximum list price can then be set at a threshold where the likelihood of selling is minimal. With respect to the minimum list price, if shipping is not independently added, sale transaction fees plus the packaging fees (mailer fees) may be used as a minimum list price. Preferably, a product may not be listed below the minimum list price unless the seller indicates that the sale has a charitable component.

In step 204, the server receives a sale order from a seller. The sale order includes product information concerning a product to be listed on the multi-vendor website. The product information includes a product title, a unique product identification number (UPC, SKU, ISBN, etc.), and a product condition. For example, if a seller desires to sell a particular book on the multi-vendor website, the sale order would include the title of the book, the ISBN of the book, and the condition of the book (new, excellent, or good).

After receiving the sale order in step 204, in step 206, the server calculates a market price for the product to be listed (hereinafter "list product"). The server utilizes the market price calculating section of the server application, which queries the database for the sales characteristics associated with the list product. The market price calculating section identifies the prior list prices and sold prices of a like product of the same condition from the stored sale characteristics and from the pricing information on external sources, and then calculates a current market price. In one embodiment, the list prices in the sale queue, the prior list and sold prices, and the current pricing information on third party websites are weighed together in order to determine the current market price. When demand exceeds supply, the market price will go up.

In step 208, the server calculates a suggested list price, a sale probability and a projected time to sale for the list product based on the market price. In one embodiment, the market price is used as the suggested list price. However, the suggested list price may also be higher or lower than the calculated market price. For instance, the current demand (number of purchases per unit of time, such as the last hour or day) may be compared to the current inventory available. If the current demand exceeds the amount of products available, and the sellers are unwilling to sell the product at the current suggested list price, the suggested list price will be raised.

Further, the server utilizes the sale probability calculating section and the projected time of sale calculating section of the server application to calculate a probability that the list product will sell at the suggested list price, and a projected length of time for the list product to sell at the suggested list price, respectively. In one embodiment, the sale probability section calculates the probability of sale at the suggested list price within a predetermined time frame (e.g. five days) based on the number of times the list product has previously sold at the suggested list price. In particular, the sale probability calculating section queries the database for the sale characteristics of the list product (i.e. historic list and sold prices, sale queue length, current rate of sale, etc.). In addition, the sale probability calculating section may utilize the current market conditions such as the season (Christmas, summer), appreciation/depreciation factors (high demand/low demand), and even the price distribution from external sources. Through the use of such a large number of pricing factors, an accurate sale probability can be calculated giving the buyer a dependable likelihood of sale. The probability may be returned to the user via the GUI as a percentage or as wording in a message box.

Similarly, a projected time to sale is calculated based on the sale queue at the suggested list price and the current rate of sale for the list product. In step 210, the suggested list price, the probability of sale, and projected time to sale are displayed to the seller using the GUI of the multi-vendor website.

In step 212 the seller determines whether to list the product at the suggested list price, or adjust the suggested list price to an alternate price. The GUI of the multi-vendor website provides a means for easily adjusting the displayed suggested list price. If the current suggested list price is not adjusted, and the seller selects the suggest list price using one-click functionality, the suggested list price is then stored in the database as the list price of the list product in step 218. This configuration provides a "single click market order" technique, enabling a seller to easily list a product based on the existing market price for the product. In one embodiment, the seller can also select a dynamic market order or static market order. In the case of the dynamic market order, the product is listed at the suggested list price, and as the market price changes, the seller's list price is automatically adjusted to the current market price. If the seller selects a static market order, the suggested list price is again selected as the list price, but the list price does not automatically change as the market changes. However, the server is also configured such that a seller can later adjust the list price to a dynamic or static market price after the initial pricing.

If the seller adjusts the suggested list price in step 212, in step 214, the probability of sale and the projected time to sale are recalculated based on the adjusted list price. The sale probability calculating section and the projected time to sale calculating section are utilized in the same manner described above with respect to the suggested list price. The adjusted list price, the sale probability, the projected time to sale, and the sale queue position at the adjusted list price are then displayed to the seller.

In step 216, a determination is made as to whether the adjusted price is selected by the user. If the user adjusts the suggested list price and uses the one-click functionality to select the adjusted price, the adjusted price is stored as the list price for the list product in step 220. Following step 220 or 218, in step 222, the list price is added to the sale queue of the list product.

Figure 3:
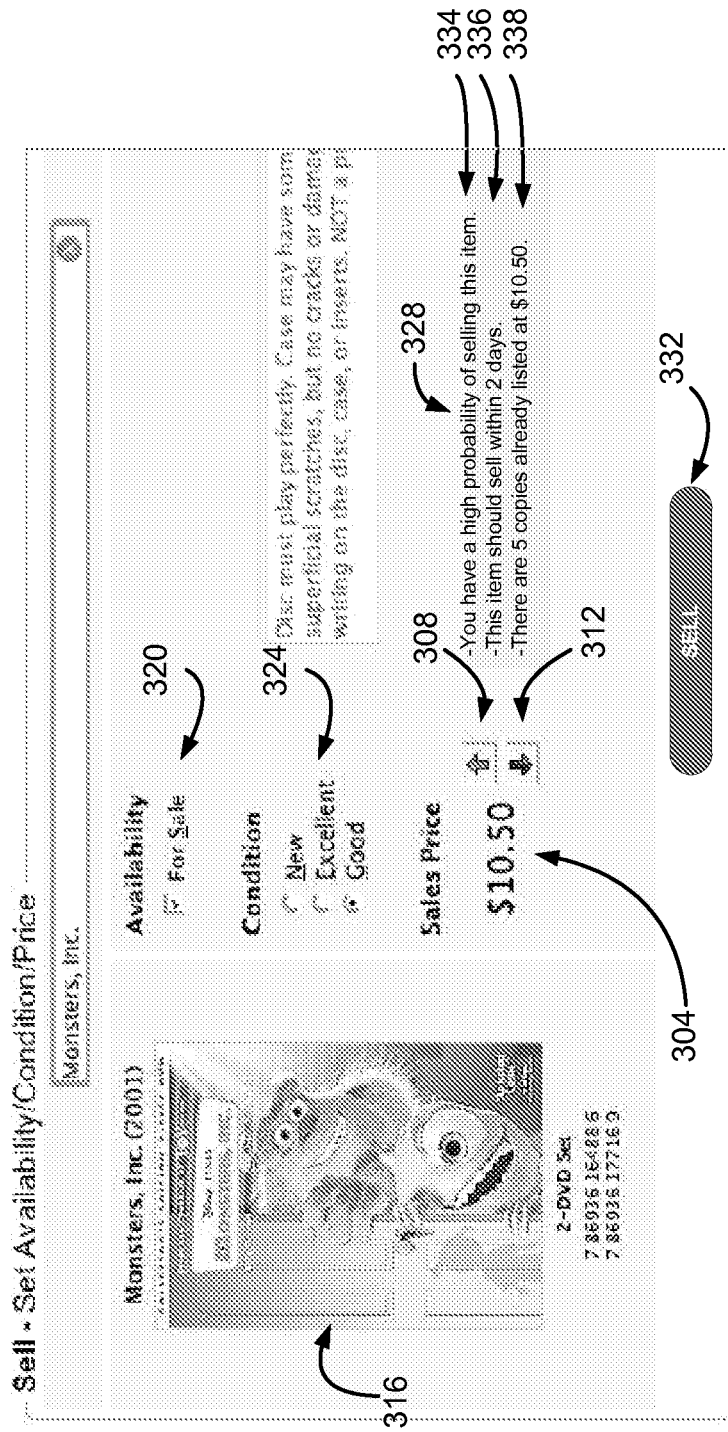
FIG. 3 is a screenshot illustrating of the pricing feature according to an embodiment of the present invention.

FIG. 3 is a screen shot illustrating the GUI of the product pricing system according to an embodiment of the present invention. A sell window 300 is displayed to a user. The sell window includes an availability option 320, product condition setting 324, sale information 328, suggested list price 304, sell button 332, list product 316, and adjustment arrows 308 and 312. In this example, the suggested list price 304 is shown as the calculated market price described above in reference to FIG. 2. The adjustment arrows 308 and 312 allow the seller to adjust the suggested list price up or down, respectively. In one embodiment, the suggested list price 304 is adjusted in increments of $0.25, however, the increments may also be much smaller or much larger. For example, if the seller wanted to list the list product 316 for $10.25, the seller simply clicks the adjustment arrow 312 once, adjusting the suggested list price 304 from $10.50 to $10.25. Furthermore, sale information 328, which includes the probability of sale 334, the projected time to sale 336, and the sale queue position 338 associated with the suggested list price or the adjusted price, is shown to the right side of the adjustment arrows 308 and 312.

Thus, features of the present invention act to drive sellers to a common market price that takes into account changing supply and demand, similar to the stock market. Sellers will be motivated to list at the lowest price in order to assure a sale of their products. By providing this information to the sellers, this behavior is encouraged.

The product pricing system is not limited to the embodiments described above. For example, if an adjusted price is selected as the list price, the seller may later return to the multi-vendor website and using the one-click functionality, place a "mark-to-market" order to change the list price to the current market price (static or dynamic). Similarly, the seller may also opt to change all products currently being sold by the seller to a dynamic or static "mark-to-market" order. This technique allows a user to rapidly and efficiently adjust to changing market conditions.

In addition, embodiments of the present invention can equally apply to the buyer side. In this way, bid information including a bid queue may be used to track the number of buyers and offer prices for a product. In this case, for a given product, a list of offer prices will be stored in the database. The market price calculating section would then calculate a market price based on the number of products offered by the seller, the number of bids, and the current list of offer prices in the bid queue. Based on the calculated market price, a suggested offer price is displayed to the buyer. This scenario is especially beneficial in the case of pre-orders, as sellers are able to know the true market value of a product pre-release, and buyers are given the opportunity to be the first to acquire a newly released product. For example, a new release of a product in limited numbers may cause its sale price to be bid up, with buyers paying a premium for early delivery from a limited supply, while knowing how high to bid up and still get the product.

It will be recognized by persons of ordinary skill in the art that the method of the invention has many applications, and that this description has not attempted to enumerate all possible variations. For example, the invention applies equally to individual, amateur sellers and to professional sellers. It applies to a single, multi-vendor website or multiple websites where sales data is collected from other websites and used in the market price calculations. In addition, the market price can be based on a combination of a price at a multi-vendor website and other websites. The invention can also be applied to non-Internet sales, such as text message sales promotions to mobile phones or hard copy listing of products in catalogs or other media.

Although the embodiments have been described with reference to products such as DVDs, CDs, and books, the product distribution system can also apply to video games, consumer electronics (i.e., PDAs, cell phones, etc.), jewelry, toys, software or any other product or service. In addition to sale transactions, the system and method according to embodiments of the present invention may also apply to rental or barter transactions. The scope of the invention also extends to various combinations and modifications that may fall within the spirit of the appended claims.

What is claimed is:

1. A method for pricing a product to be sold over the internet comprising a server computer connected to a network, a computer processor, and a database, the method comprising:
    storing sales characteristics for each of a plurality of products in the database, the sales characteristics including sale history and sale queue information, the sale queue information being information regarding a sale queue and including current list prices for the plurality of products currently being offered for sale, the sale queue information further including the number of products being offered for sale at each of the current list prices, the sale queue information further including the condition of each product being offered for sale;
    receiving, at the server computer via the network, a sale order from a seller, the sale order including product information of a list product associated with one of the plurality of products;
    calculating, by the computer processor, a market price prior to listing the list product for sale to a potential buyer of the list product, the market price being calculated based on the product information in the sale order and the sale characteristics of the list product;
    causing to display, by the computer processor, after calculating the market price and prior to listing the list product for sale to the potential buyer of the list product, a suggested list price to the seller based on the market price, the suggested list price indicating a suggested price of the list product at which the seller may attempt to sell the list product to the potential buyer; and
    causing to display to the potential buyer only a lowest price offered by the best seller of each product, with higher prices by other sellers being held in said sale queue and caused to be displayed only after the sale of products at lower prices;
    wherein the best seller is the seller with the highest reliability rating.

2. The method of claim 1 further comprising:
    listing, by the computer processor, in response to agreement by the seller, the list product at the suggested list price; and
    varying, by the computer processor, the price of the list product in accordance with variations in the market price, without further input from said seller.

3. The method of claim 1 further comprising:
    calculating, by the computer processor, a sale probability and a projected time to sale for the list product based upon the suggested list price, the market price, and the sale queue information of the list product; and
    causing to display, by the computer processor, to the seller at least one of the sale probability, the projected time to sale, and the sale queue information of the list product based upon the suggested list price.

4. The method of claim 1 further comprising:
    adjusting, by the computer processor, the suggested list price to an adjusted list price in response to seller input.

5. The method of claim 4 further comprising:
    recalculating, by the computer processor, the sale probability and the projected time to sale for the list product based upon the adjusted list price, the market price, and the sale queue information of the list product; and
    causing to display, by the computer processor, to the seller at least one of the sale probability, the projected time to sale, and the sale queue information of the list product based upon the adjusted list price.

6. The method of claim 5 further comprising:
    adding, by the computer processor, one of the suggested list price and the adjusted list price to the sale queue information of the list product.

7. The method according to claim 1, wherein the sales history includes list price history, sold price history, and a current rate of sale of the list product.

8. The method according to claim 1 further comprising:
    determining, by the computer processor, a maximum price and a minimum price for each of the plurality of products.

9. The method according to claim 1 wherein the product information includes a title of the product, a product identification number, and a product condition.

10. The method according to claim 9 wherein the product identification number is one of a Universal Product Code (UPC), an International Standard Book Number (ISBN), and a Stock Keeping Unit (SKU).

11. A computer-implemented system for distributing a product sold over the internet, the system comprising:
    a computer processor;
    a database configured to store sale characteristics for a plurality of products, the sales characteristics including sales history and sale queue information, the sale queue information being information regarding a sale queue and including current list prices for the plurality of products currently being offered for sale, the sale queue information further including the number of products being offered for sale at each of the current list prices, the sale queue information further including the condition of each product being offered for sale;
    a communication interface configured to receive a sale order from a seller, the sale order including product information of a list product associated with one of the plurality of products; and
    computer readable media including computer readable code for a software application comprising:
    a market price calculating section configured to calculate a market price prior to listing the list product for sale to a potential buyer of the list product, the market price being calculated based on the product information in the sale order and the sale characteristics of the list product; and a user interface for causing to display, after calculating the market price and prior to listing the list product for sale to the potential buyer of the list product, a suggested list price to the seller based on the market price, the suggested list price indicating a suggested price of the list product at which the seller may attempt to sell the list product to the potential buyer;

wherein the communication interface is further configured to transmit for display to the potential buyer only a lowest price offered by the best seller of each product, with higher prices by other sellers being held in said sale queue and caused to be displayed only after the sale of products at lower prices;

wherein the best seller is the seller with the highest reliability rating.

12. The system of claim 11 wherein the user interface is configured to adjust the suggested list price to an adjusted list price in response to seller input.

13. The system of claim 11 wherein the computer readable media including computer readable code for a software application further comprises:

a sale probability calculating section configured to calculate a sale probability for the suggested list price or an adjusted list price based upon the market price, the sales history, and the sale queue information of the list product; and a projected time to sale calculating section configured to calculate a projected time to sale for the suggested list price or the adjusted list price based upon the market price and the sale queue information of the list product;

wherein the user interface is configured to cause to display to the seller, the sale probability, the projected time to sale, and the sale queue information of the list product based upon the suggested list price or the adjusted list price.

14. The system of claim 11, wherein the sales history includes list price history, sold price history, and a current rate of sale for the list product.

15. The system of claim 11 wherein the product information includes a title of the product, a product identification number, and a product condition.

16. The system of claim 15 wherein the product identification number is one of a Universal Product Code (UPC), an International Standard Book Number (ISBN), and a Stock Keeping Unit (SKU).

17. A method for pricing a product to be sold over the internet comprising a server computer connected to a network, a computer processor, and a database, the method comprising:

storing sales characteristics for each of a plurality of products in the database, the sales characteristics including sales history and sale queue information, the sale queue information being information regarding a sale queue and including current list prices for the plurality of products currently being offered for sale, the sale queue information further including the number of products being offered for sale at each of the current list prices, the sale queue information further including the condition of each product being offered for sale;

receiving, at the server via the network, a sale order from a seller, the sale order including product information of a list product associated with one of the plurality of products;

calculating, by the computer processor, a market price prior to listing the list product for sale to a potential buyer of the list product, the market price being calculated based on the product information in the sale order and the sale characteristics of the list product;

causing to display, by the computer processor, after calculating the market price and prior to listing the list product for sale to the potential buyer of the list product, a suggested list price to the seller based on the market, the suggested list price indicating a suggested price of the list product at which the seller may attempt to sell the list product to the potential buyer;

listing, by the computer processor, in response to agreement by the seller, the list product at the suggested list price;

varying, by the computer processor, the price of the list product in accordance with variations in the market price, without further input from said seller; and causing to display to the potential buyer only a lowest price offered by the best seller of each product, with higher prices by other sellers being held in said sale queue and caused to be displayed only after the sale of products at lower prices;

wherein the best seller is the seller with the highest reliability rating.

18. The method of claim 17 further comprising:

listing, by the computer processor, in response to agreement by the seller, the list product at the suggested list price; and varying, by the computer processor, the price of the list product in accordance with variations in the market price, without further input from said seller.

19. The method of claim 17 further comprising:

calculating, by the computer processor, a sale probability for the suggested list price or an adjusted list price based upon the market price, the sales history, and the sale queue information of the list product;

calculating, by the computer processor, a projected time to sale for the suggested list price or the adjusted list price based upon the market price and the sale queue information of the list product; and causing to display to the seller, the sale probability, the projected time to sale, and the sale queue information of the list product based upon the suggested list price or the adjusted list price.

20. The method of claim 17 further comprising:

adjusting, by the computer processor, the suggested list price to an adjusted list price in response to seller input;

recalculating, by the computer processor, the sale probability and the projected time to sale for the list product based upon the adjusted list price, the market price, and the sale queue information of the list product; and causing to display to the seller at least one of the sale probability, the projected time to sale, and the sale queue information of the list product based upon the adjusted list price.

* * * * *